United States Patent [19]

Deak et al.

[11] Patent Number: 4,486,809
[45] Date of Patent: Dec. 4, 1984

[54] ANCHORING MEANS FOR A CAPACITOR

[75] Inventors: Paul S. Deak, Indianapolis; Dennis R. Henderson, Greenwood; Gerald A. Voyles, Indianapolis, all of Ind.

[73] Assignee: Emhart Industries, Inc., Indianapolis, Ind.

[21] Appl. No.: 403,914

[22] Filed: Jul. 30, 1982

Related U.S. Application Data

[63] Continuation-in-part of Ser. No. 237,071, Feb. 23, 1981, abandoned.

[51] Int. Cl.³ .............................................. H01G 1/11
[52] U.S. Cl. .................................................... 361/272
[58] Field of Search ................................. 361/272, 331

[56] References Cited

U.S. PATENT DOCUMENTS 4,059,848 11/1977 Koel et al. ............................ 361/272
4,339,786 7/1982 Evans et al. ..................... 361/272 X

FOREIGN PATENT DOCUMENTS 260576 6/1964 Australia ............................. 361/272
1351290 4/1974 United Kingdom ................ 361/272

Primary Examiner—Donald A. Griffin
Attorney, Agent, or Firm—Robert F. Meyer

[57] ABSTRACT

A capacitor body that is carried in a container is anchored within the container by a cup-shaped member that is disposed at opposite ends of the capacitor body. Each cup-shaped member includes a spike which engages the ends of the capacitor body to hold it in place.

In a preferred embodiment, the spike is cylindrical and engages a hollow core having a bore that is hexagonal in cross-section.

5 Claims, 3 Drawing Figures

ANCHORING MEANS FOR A CAPACITOR

This is a continuation-in-part of application Ser. No. 06/237,071, "Anchoring Means For a Capacitor" filed Feb. 23, 1981, now abandoned.

BACKGROUND OF THE INVENTION

Generally speaking, the present invention relates to a capacitor assembly which comprises a container having a bottom and an open end, a capacitor body carried in the container including a centrally disposed hollow core having a bore composed of substantially flat intersecting surfaces, a cup-shaped member carried on the bottom and having a centrally disposed spike extending into the hollow core to engage surfaces of the bore and lock the spike in place, means closing the open end of the container and means for electrically connecting the capacitor body into an electrical circuit.

It is well known that electrical capacitors are subjected to varying amounts of mechanical vibrations. One standard method of avoiding damage to the capacitor due to vibration is to place tar or asphalt in the bottom of the capacitor body. Of recent years, varying types of anchoring spikes such as described in U.S. Pat. No. 3,697,824 issued Oct. 10, 1972 to John B. Greskamp have been used. While such arrangements have been, for the most part satisfactory, they are sometimes complicated to fabricate in a capacitor assembly and, in addition, they sometimes do not provide adequate electrical insulation between the capacitor body and the container.

OBJECTS OR FEATURES OF THE INVENTION

Accordingly, it is a feature of the invention to provide an anchoring means for a capacitor body that is carried in a container. Another object of the invention is to provide such an anchoring means that is simple and easy to produce. Another object of the invention is to provide such an anchoring means which provides electrical insulation between the capacitor body and the container. Another feature of the invention is to provide such an anchoring means which includes a thin walled cup-shaped member carried on the bottom of the container and having a spike engaging the capacitor body. Yet another object of the invention is to provide such an anchoring means which includes a second cup-shaped member with a spike carried at the opposite ends of the container and engaging the capacitor body. These and other features of the invention will become apparent from the following description taken in conjunction with the accompanying drawings.

DETAILED DESCRIPTION OF THE DRAWINGS

Figure 1:
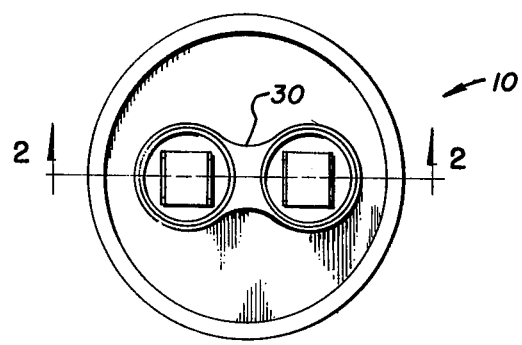
FIG. 1 is a top view of a capacitor assembly employing the features of the invention.
Figure 2:
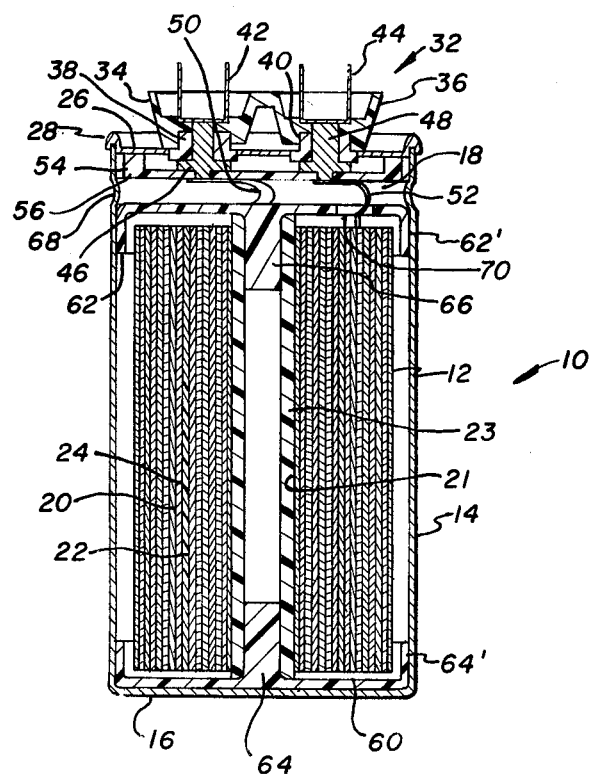
FIG. 2 is a section taken along the line 2—2 of FIG. 1.

Referring now to the drawings, there is shown a capacitor assembly 10 which, in general, includes a capacitor body 12 which is carried in a container 14 having a bottom 16 and an open end 18. Container 14 may be made of a metal or metal alloy or it may be fabricated of a suitable thermo-plastic material. Capacitor body 12 comprises a plurality of metal electrodes 20 and 22 which are separated by spacers 24. The spacer members may be impregnated with a liquid electrolyte and/or a dielectric fluid of known compositions. The electrodes and the spacer members are wound to provide an open axial center 21 by either winding the electrodes and spacer members on a removable mandrel or on a rigid hollow core 23.

The open end of the container is closed by a lid 26, the lid being sealed into the outer rim 28 of the container by crimping, seaming or other suitable means. As shown, the lid contains opening 30 through which a terminal assembly 32 may be inserted. The terminal assembly includes an insulator with cups 34 and 36 which are carried on bushing 38. Terminals 42 and 44 are electrically connected to rivets 46 and 48 which are electrically connected to tabs 50 and 52. Tabs 50 and 52 are electrically connected to electrodes 20 and 22. The assembly also includes an interrupter 54 which in the present embodiment includes a plastic disc 56 carried by the rivets 46 and 48. When damage occurs to the capacitor body within the container, expansion of fluids such as gasses will, through the interrupter, cause at least one of the tabs 50 or 52 to break causing interruption of the electrical circuit between the terminals and the electrodes 20 and 22.

According to the present invention, capacitor body 12 is anchored within the container 14 through a pair of thin walled cup-shaped members 60 and 62. As shown, cup-shaped member 60 is carried on the bottom of the container 14 and includes a centrally disposed spike 64 which is integrally constructed with the cup-shaped member. Spike 64 engages capacitor body 14 through hollow core 23. In some cases, depending upon the winding of the electrodes 20 and 22 and spacer members 24, the hollow core may not be needed. In such instances, spike 64 would engage the open axial center 21 of the winding.

Cup-shaped member 62 includes a centrally disposed spike 66 which is integrally constructed with the cup-shaped member. Spike 66 is forced into hollow core 23 until the end of the mandrel engages the bottom of the cup-shaped member 62. In those cases where a hollow core is not used, spike 66 would be inserted into the winding center 21 until the base of cup-shaped member 62 comes into contact with the capacitor body 14. The cup-shaped member 62 is held in position by a circumferential bead or dimples 68 provided in container 14. Cup-shaped member 62 also includes openings 70 (one shown) through which tabs 50 and 52 may be extended.

The use of the cup-shaped members 62 and 64 with their attendant side walls 62' and 64' provide electrical insulation between the capacitor body 12 and container 14.

Figure 3:
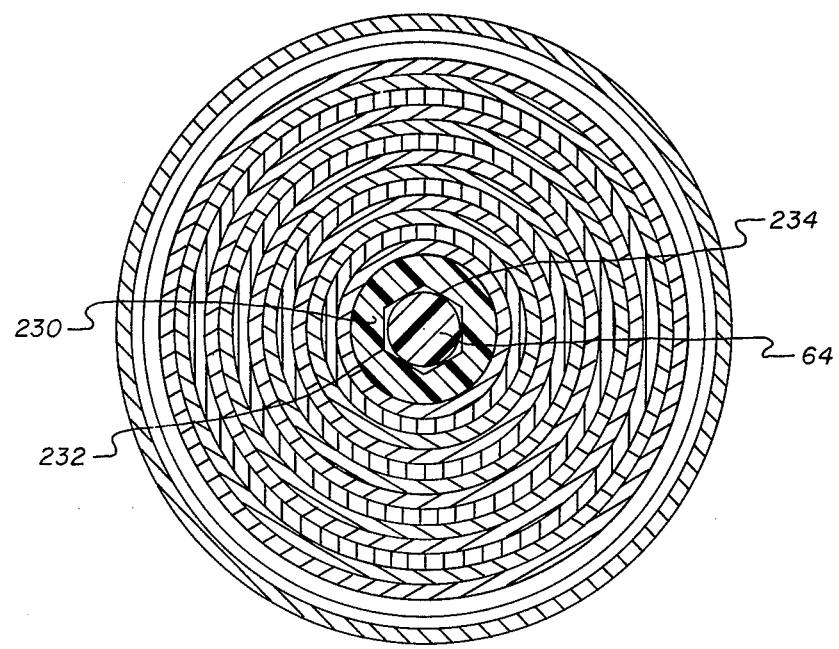
FIG. 3 is a section taken along line 3—3 of FIG. 2.

Referring now to FIG. 3, there is shown a preferred embodiment of the invention. In this embodiment, hollow core 230 has a core 232 composed of a plurality of substantially flat intersecting surfaces 234. As shown, the substantially flat intersecting surfaces form a hexagon. Upon insertion of spike 64, which is cylindrical, the substantially flat intersecting surfaces of the bore will be engaged by the spike to lock it in place thereby further reducing mechanical vibrations.

Although not shown, the substantially flat intersecting surfaces extend along the entire length of the bore so that spike 66, which is also cylindrical, will similarly be locked in place.

What is claimed is:

1. A capacitor assembly comprising a container having a bottom and an open end, a capacitor body carried in said container including a centrally disposed hollow core having a bore composed of a plurality of substantially flat intersecting surfaces forming a hexagon and a cup-shaped member carried on said bottom and having a centrally disposed spike extending into said hollow core and engaging said substantially flat intersecting surfaces forming a hexagon to lock said spike in place, means closing said open end, and means for electrically connecting said capacitor body to an electrical current.

2. A capacitor assembly according to claim 1 further comprising a second cup-shaped member carried at said open end and having a second spike engaging said hollow core and engaging said substantially flat intersecting surfaces forming a hexagon to lock said spike in place, and holding means to maintain said second cup-shaped member in an axial fixed position.

3. A capacitor assembly according to claim 2 wherein said holding means comprises at least two dimples provided in said container and engaging said second cup-shaped member.

4. A capacitor assembly according to claim 2 wherein said second cup-shaped member and said second spike are integrally constructed of an electrically insulative material.

5. A capacitor assembly according to claim 1 wherein said cup-shaped member and said spike are integrally constructed of an electrically insulative material.

* * * * *